(12) United States Patent
Kajino et al.

(10) Patent No.: US 7,729,212 B2
(45) Date of Patent: Jun. 1, 2010

(54) OBJECTIVE LENS DRIVING DEVICE, OPTICAL PICKUP DEVICE, AND OPTICAL DISK DRIVE

(75) Inventors: Osamu Kajino, Osaka (JP); Hironori Tomita, Nara (JP); Kanji Wakabayashi, Kyoto (JP); Koji Ieki, Osaka (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 11/866,441

(22) Filed: Oct. 3, 2007

(65) Prior Publication Data
US 2008/0084811 A1 Apr. 10, 2008

(30) Foreign Application Priority Data
Oct. 5, 2006 (JP) .............................. 2006-273821

(51) Int. Cl.
*G11B 7/00* (2006.01)
(52) U.S. Cl. .................................................. 369/44.14
(58) Field of Classification Search ........................ None
See application file for complete search history.

(56) References Cited

U.S. PATENT DOCUMENTS 5,182,738 A * 1/1993 Yoshikawa ............... 369/44.14
5,898,653 A * 4/1999 Yoshizawa ............... 369/44.27
5,933,405 A * 8/1999 Song ......................... 720/683
6,778,472 B2 * 8/2004 Nishikawa ............... 369/44.21
2003/0103441 A1 6/2003 Kim et al.
2005/0265141 A1 * 12/2005 Pae et al. .................. 369/44.14
2007/0253296 A1 * 11/2007 Iijima et al. .............. 369/44.15

FOREIGN PATENT DOCUMENTS

JP 2003-281758 10/2003

* cited by examiner

*Primary Examiner*—Peter Vincent Agustin
(74) *Attorney, Agent, or Firm*—Renner, Otto, Boisselle & Sklar, LLP

(57) ABSTRACT

The objective lens driving device of the present invention for an optical pickup device is provided. The device includes first and second objective lenses, and a lens holder for supporting the first and second objective lenses. The lens holder has a first through-hole for passage of first laser beam and a second through-hole for passage of second laser beam. Where a plane defined by a central axis of the first objective lens and a central axis of the second objective lens is a central plane, a plane perpendicular to the central plane and including the central axis of the first objective lens is a first plane, and a plane perpendicular to the central plane and including the central axis of the second objective lens is a second plane; the first through-hole is asymmetrical with respect to the first plane and/or the second through-hole is asymmetrical with respect to the second plane.

13 Claims, 10 Drawing Sheets

FIG.1
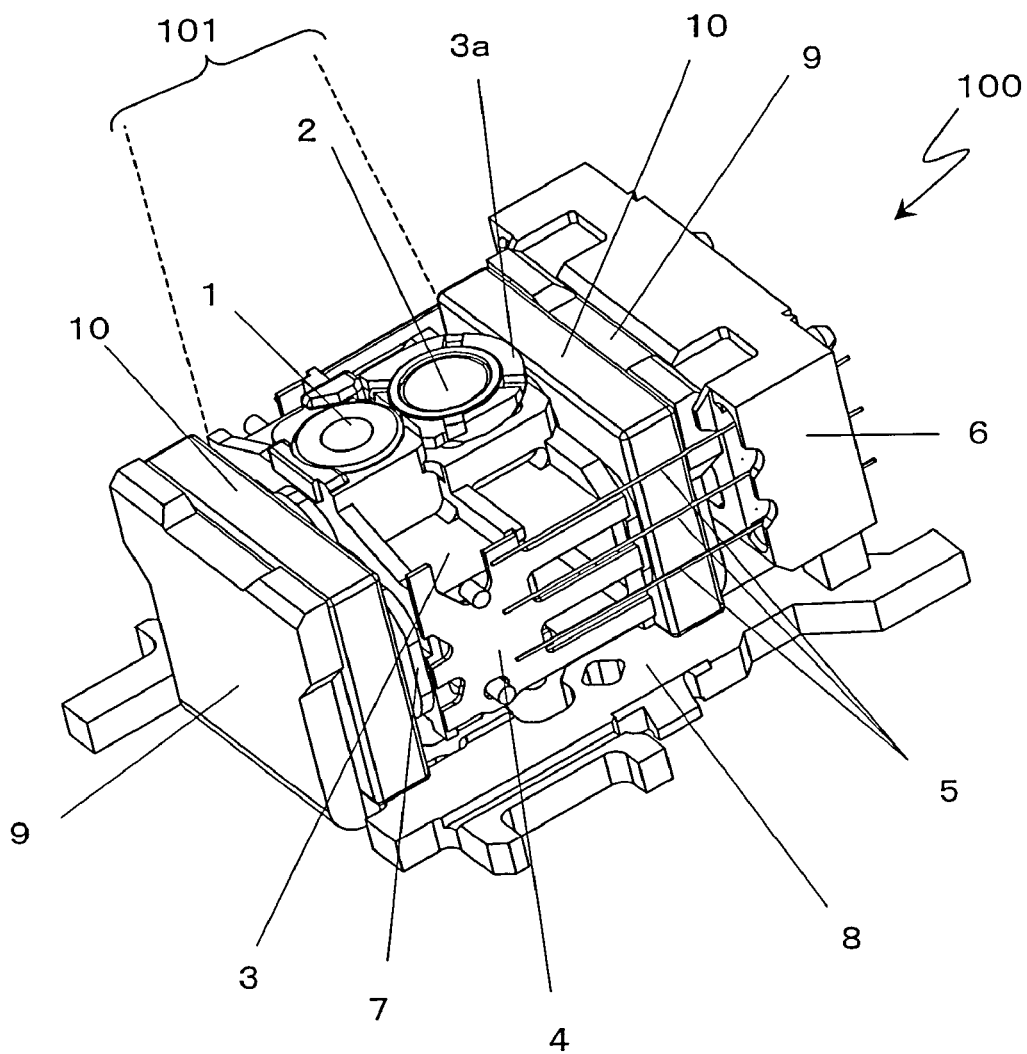
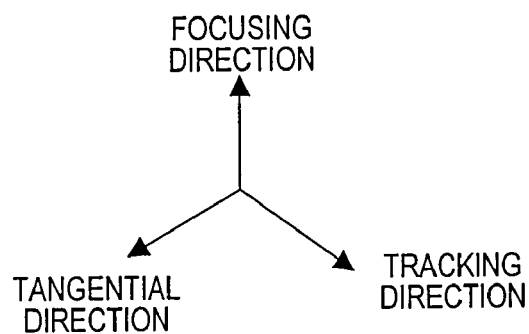

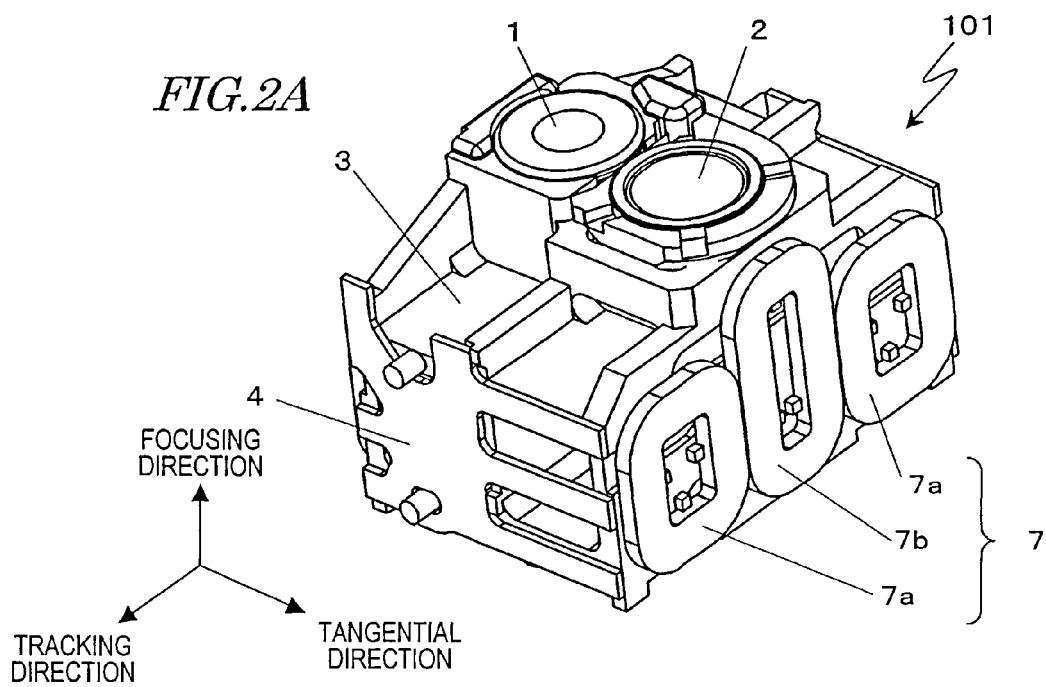
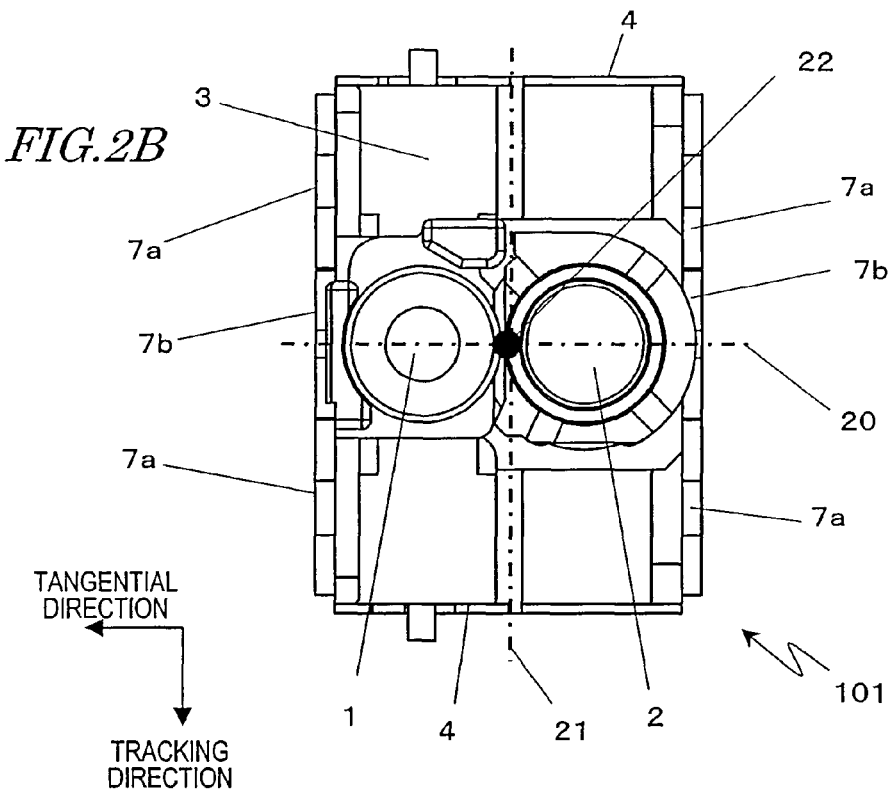

WEIGHT AND SHIFTING AMOUNT OF THE GRAVITY CENTER

RESONANCE FREQUENCY AND SHIFTING AMOUNT OF THE GRAVITY CENTER

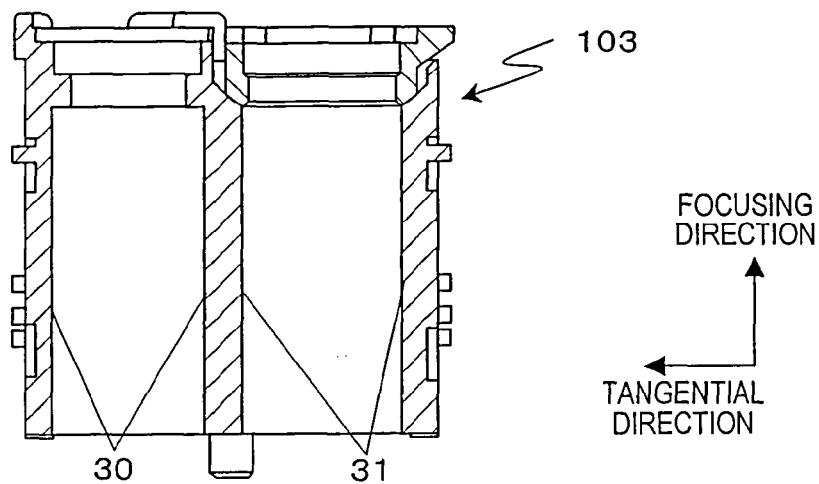
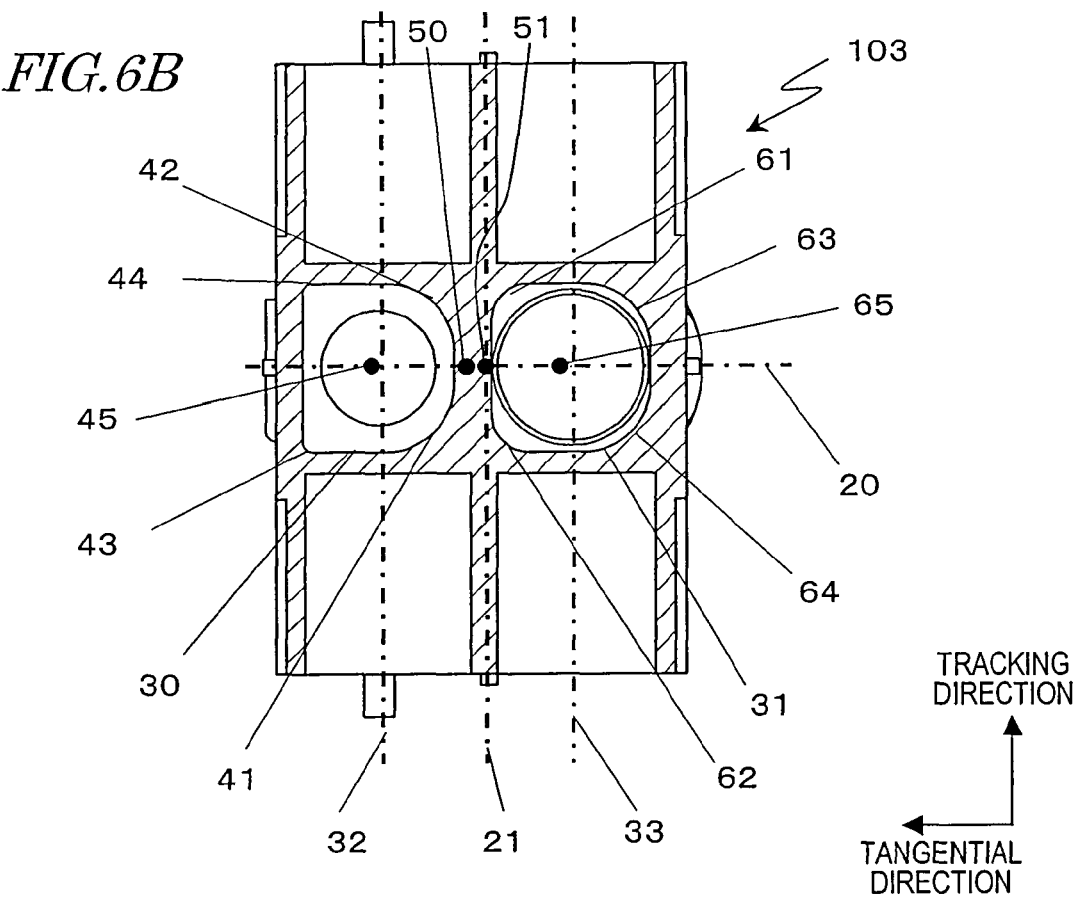

303   304

OBJECTIVE LENS DRIVING DEVICE, OPTICAL PICKUP DEVICE, AND OPTICAL DISK DRIVE

BACKGROUND OF THE INVENTION

1. Field of the Invention

The present invention relates to an optical disk drive for writing data to, and reading data from, a plurality of types of optical disks having different recording densities, an optical pickup device usable for such an optical disk drive, and an objective lens driving device usable for such an optical pickup device; and more particularly relates to an objective lens driving device, usable for an optical pickup device, having a plurality of objective lens mounted thereon.

2. Description of the Related Art

As disk-type recording mediums (optical disks) usable for data write and/or data read utilizing light, CDs (Compact Discs) and DVDs (Digital Versatile Discs) are currently in wide use. In addition to these disks, BDs (Blu-ray Discs) and other optical disks having a high recording density have been recently proposed and developed. The wavelength of used for such optical disks is 780 nm or the vicinity thereof for CDs, 660 nm or the vicinity thereof for DVDs, and 405 nm or the vicinity thereof for BDs or the like.

It is desired that one optical pickup device should be usable to perform data recording to, and data reproduction from, a plurality of types of optical disks used with different wavelengths of laser beam. In one example of an optical pickup device proposed to realize this, different objective lenses respectively prepared for CDs/DVDS and BDs are mounted on one objective lens driving device.

FIG. 10A shows an exemplary objective lens driving device, in a conventional optical pickup device, having two types of objective lenses mounted thereon. Such an objective lens driving device is described in, for example, Japanese Laid-Open Patent Publication No. 2003-281758.

A lens holder 300 includes a first objective lens setting opening 301 and a second objective lens setting opening 302, which are respectively formed to allow a first objective lens and a second objective lens (not shown) to be mounted therein.

FIG. 10B shows a first through-hole 303 and a second through-hole 304 which pass through the lens holder 300. The first objective lens setting opening 301 and the second objective lens setting opening 302 are respectively open ends of the first through-hole 303 and the second through-hole 304. It is not necessary that the first objective lens setting opening 301 and the second objective lens setting opening 302 have the same diameter or that the first through-hole 303 and the second through-hole 304 have the same diameter.

The first through-hole 303 and the second through-hole 304 are optical paths for laser beam incident from a light source (not shown) provided below the first through-hole 303 and the second through-hole 304 in a focusing direction. The laser beam which has passed through the first or second objective lens is focused at an optical disk (not shown) provided above the first through-hole 303 or the second through-hole 304 in the focusing direction, and the light reflected by the optical disk returns in the corresponding path in the opposite direction back to a detector (not shown) provided on the light source side.

The lens holder 300 also includes a magnetic circuit elastically supported by a spring (not shown) for driving the first or second objective lens independently in the focusing direction perpendicular to a recording surface of the optical disk and in a tracking direction matching a radial direction of the optical disk.

The recent demand for a higher recoding/reproduction speed requires an increased driving force, which in turn requires a movable section including the lens holder 300 to be more lightweight, and accordingly, to have a higher sensitivity. The movable section is also required to have a higher rigidity and thus to have a higher resonance frequency in a high frequency range, so that the movable section is compatible with a control system having an increased gain. Namely, the objective lens driving device is desired to have opposing characteristics of a less weight and a higher rigidity.

In an optical pickup device having two types of objective lenses mounted thereon, the two lenses often have different weights. The material for the lenses is preferably a plastic material for reducing the cost and weight, but glass is occasionally chosen as the material of the objective lens used for laser beam having a wavelength of 405 nm from the viewpoint of the resistance against light. Assuming, for example, the objective lens used for DVDs is formed of a plastic material, the glass objective lens may be three time or more heavier than the plastic objective lens due to the difference in the specific gravity between glass and plastics.

When such lenses having different weights are mounted on the lens holder 300, the weight balance is destroyed and the gravity center is shifted from the center of the movable section. If the entire lens holder 300 is sufficiently large to optimize the positions of the individual lenses, it is possible to set the gravity center at the center of the lens holder 300, which matches the center of the driving force generated by the magnetic circuit.

However, it is preferred that the lens holder 300 is as small as possible in order to fulfill the recent demands for a less weight and a higher rigidity required for an operation in more highly multiplied speed modes. It is also desired that the two lenses are located as close as possible to each other, which significantly restricts the designing freedom. Therefore, it is difficult to optimize the weight balance by lens arrangement.

Where the weight balance is destroyed and thus the gravity center is shifted from the center of the movable section (driving force center), the following problems occur. When a driving force generated by the magnetic circuit is acted on the movable section, a rotation moment is generated due to the center of the driving force being shifted from the gravity center. This causes unnecessary resonance and thus destabilizes the control on the objective lens driving device.

For example, in the example shown in FIG. 10A, the objective lenses are located side by side in the tracking direction. Therefore, the weight balance in the tracking direction is destroyed. As a result, when the movable section is entirely driven in the focusing direction, rolling resonance is generated by which the movable section is rotated with a tangential direction being used as the rotation axis. In a different example where the objective lenses are located side by side in the tangential direction, when the movable section is entirely driven in the focusing direction, pitching resonance is generated by which the movable section is rotated with the tracking direction being used as the rotation axis.

SUMMARY OF THE INVENTION

An object of the present invention is to provide an objective lens driving device capable of reducing the factors which destabilize the control on the objective lens driving device such as the rolling resonance or the pitching resonance caused by the destroyed weight balance of the objective lens driving device, at low cost without requiring additional components such as a balancing member or the like while minimizing the influence of the sensitivity reduction or rigidity reduction.

An objective lens driving device according to the present invention is usable for an optical pickup device. The objective lens driving device includes a first objective lens for focusing first laser beam; a second objective lens for focusing second laser beam; and a lens holder for supporting the first objective lens and the second objective lens. In the lens holder, a first through-hole and a second through-hole are provided. The first through-hole allows the first laser beam to pass therethrough and a second through-hole allows the second laser beam to pass therethrough. Where a plane is defined as a central plane by a central axis of the first objective lens and a central axis of the second objective lens, a plane which is perpendicular to the central plane and includes the central axis of the first objective lens is defined as a first plane, and a plane which is perpendicular to the central plane and includes the central axis of the second objective lens is defined as a second plane; the first through-hole is asymmetrical with respect to the first plane and/or the second through-hole is asymmetrical with respect to the second plane.

The first objective lens may be heavier than the second objective lens, and a centroid of a cross-section of the first through-hole taken along a plane perpendicular to the central axis of the first objective lens may be positioned in the lens holder outer with respect to the central axis of the first objective lens.

The second objective lens may be more lightweight than the first objective lens, and a centroid of a cross-section of the second through-hole taken along a plane perpendicular to the central axis of the second objective lens may be positioned in the lens holder inner with respect to the central axis of the second objective lens.

The cross-section of the first through-hole taken along the plane perpendicular to the central axis of the first objective lens may be substantially quadrangular; areas corresponding to four corners of the substantially quadrangular cross-section may be formed to be arc-shaped; and two of the arc-shaped areas positioned in an outer area of the lens holder may have a smaller radius than the other two of the arc-shaped areas positioned in an inner area of the lens holder.

The cross-section of the second through-hole taken along the plane perpendicular to the central axis of the second objective lens may be substantially quadrangular; areas corresponding to four corners of the substantially quadrangular cross-section may be formed to be arc-shaped; and two of the arc-shaped areas positioned in an inner area of the lens holder may have a smaller radius than the other two of the arc-shaped areas positioned in an outer area of the lens holder.

The first objective lens may be heavier than the second objective lens; and a centroid of the cross-section of the first through-hole taken along the central plane may be positioned in the lens holder outer with respect to the central axis of the first objective lens.

A peripheral wall of the first through-hole may be more distanced from the central axis of the first through-hole at least at one position in accordance with a distance from the first objective lens.

The peripheral wall of the first through-hole may be more distanced from the central axis of the first through-hole continuously or step by step in accordance with a distance from the first objective lens.

The first objective lens and the second objective lens may have different weights.

One of the first objective lens and the second objective lens may be a glass lens and other may be a plastic lens.

The first objective lens and the second objective lens may be formed of an identical material.

An optical pickup device according to the present invention includes the above-described objective lens driving device; a first laser light source for outputting first laser beam; and a second laser light source for outputting second laser beam. The first laser beam and the second laser beam are respectively focused onto information recording surfaces of different types of optical disks.

An optical disk drive according to the present invention includes the above-described optical pickup device; a motor for driving an optical disk to rotate; and a control section for controlling the optical pickup device and the motor.

According to the present invention, the cross-sectional shapes of the first through-hole and the second through-hole are asymmetrical respectively with respect to the first plane which is perpendicular to the central plane and includes the central axis of the corresponding objective lens and the second plane which is perpendicular to the central plane and includes the central axis of the corresponding objective lens. Therefore, the weight balance in the direction in which the objective lenses are arranged can be changed by merely changing the shape of the through-holes, so that the weight unbalance caused by the difference in the diameter, weight or the like between the objective lenses can be alleviated.

According to the present invention, the cross-section of the first through-hole provided below the heavier first objective lens has a shape in which the centroid thereof is positioned in the lens holder outer with respect to the central axis of the corresponding first objective lens. Therefore, the volume of the outer part of the lens holder, which is far from the center of the movable section, is more decreased, so that a large effect of moving the gravity center is provided by a small amount of decrease. As a result, the weight balance can be improved while the rigidity deterioration of the entire movable section is suppressed minimum.

According to the present invention, the cross-section of the first through-hole is substantially quadrangular with arc-shaped area corresponding to the four corners. Two of the arc-shaped areas in the outer part of the lens holder have a smaller diameter than the diameter of the two of the arc-shaped areas in the inner part. Therefore, the weight balance can be improved merely by changing the diameter of the arc-shaped areas while the cross-section is kept substantially quadrangular and the rigidity deterioration of the entire movable section is suppressed minimum.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is an isometric view of an objective lens driving device 100 according to Embodiment 1.

FIG. 2A is an isometric view of a movable section 101 according to Embodiment 1.

FIG. 2B is a plan view of the movable section 101 according to Embodiment 1.

FIG. 6A is a cross-sectional view of a lens holder 103 according to Embodiment 2 taken along the first central plane 20.

FIG. 6B is a cross-sectional view of the lens holder 103 according to Embodiment 2 taken along the third plane 34.

DETAILED DESCRIPTION OF PREFERRED EMBODIMENTS

Figure 3A:
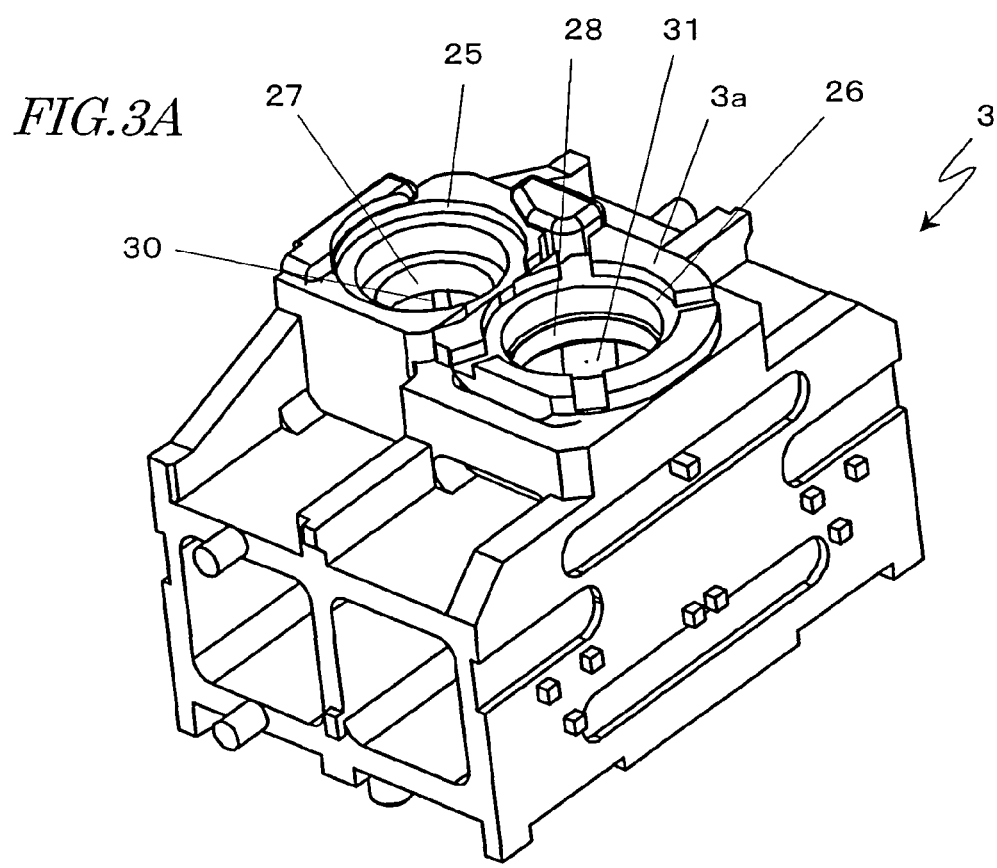
FIG. 3A is an isometric view of a lens holder 3 according to Embodiment 1.

Hereinafter, embodiments of an objective lens driving device according to the present invention will be described with reference to the accompanying drawings.

Embodiment 1

FIG. 1 is an isometric view of an objective lens driving device 100 according to this embodiment. The objective lens driving device 100 includes a first objective lens 1, a second objective lens 2, a lens holder 3, terminal boards (only one is shown in FIG. 1) 4, wires 5, a suspension holder 6, a coil unit 7, a base 8, yokes 9 and magnets 10.

The first objective lens 1 and the second objective lens 2 are located facing an optical disk (not shown), which is a disk-shaped recording medium. Information is recorded or reproduced by irradiating a recording layer of the optical disk with laser beam.

The first objective lens 1 is provided for an optical disk usable with laser beam having a wavelength of 405 nm or the vicinity thereof (for example, a BD). The first objective lens 1 is formed of glass, which has an excellent resistance against light, and is structured to be capable of forming a very small spot owing to a high numerical aperture (NA) thereof.

The second objective lens 2 is provided for both a CD usable with laser beam having a wavelength of 780 nm or the vicinity thereof and a DVD usable with laser beam having a wavelength of 660 nm or the vicinity thereof. The second objective lens 2 is formed of a plastic material and thus is available at relatively low cost. The weight of the second objective lens 2 is, for example, about ⅓ of that of the first objective lens 1 formed of glass.

The lens holder 3 is a member for securing and supporting the first and second objective lenses 1 and 2. The lens holder 3 is formed of, for example, a resin containing lightweight and highly rigid fibers. The lens holder 3 is partially removed to be more lightweight, and has many ribs provided to be structurally more rigid. In this manner, the shape of the lens holder 3 is optimized.

The objective lens driving device 100 is structured to be entirely movable in a tracking direction, which is a radial direction of the optical disks, by a transportation apparatus (not shown).

In the lens holder 3, the first objective lens 1 and the second objective lens 2 are located side by side in a tangential direction. The tangential direction is perpendicular to both the tracking direction and a focusing direction. The lens holder 3 is structured to be unlikely to contact a spindle motor 211 (FIG. 9), an optical disk cartridge (not shown) and other members described later when the objective lens driving device 100 is transported toward an inner position or an outer position of the optical disks.

The second objective lens 2 is bonded to the lens holder 3 via a swinging holder 3a. The swinging holder 3a and the lens holder 3 contact each other via a spherical sliding surface (not shown), such that the relative tilt of the lens holder 3 and the second objective lens 2 is freely settable within a predetermined range. After the relative tilt is adjusted, the lens holder 3 and the second objective lens 2 are secured to each other with an adhesive or the like.

Each terminal board 4 is a small board secured to a corresponding end of the lens holder 3 in the tracking direction. The terminal boards 4 are secured to the lens holder 3 with an adhesive or the like, and have six wires 5 in total as elastic supporting members. Each wire 5 is soldered to the corresponding terminal at one end thereof. The other end of each wire 5 is soldered to a board (not shown) provided in the suspension holder 6. Although three wires 5 are shown in FIG. 1, the other three wires 5 are provided at symmetrical positions with respect to the center of the lenses 1 and 2.

The wires 5 also act as a member for conducting electricity to the coil unit 7 provided to the lens holder 3. The wires 5 are located such that the longitudinal direction thereof is along the tangential direction. The wires 5 elastically support the lens holder 3 having the first objective lens 1 and the second objective lens 2 mounted thereon, such that the lens holder 3 is movable in the focusing direction and the tracking direction. FIG. 1 shows a movable section 101 interposed between magnets 10. The movable section 101 will be described later in more detail.

The suspension holder 6 secures and supports the above-described end of each wire 5 and includes pockets for accommodating a gel-type vibration suppressing member. The pockets are provided in the vicinity of the positions at which the wires 5 are secured and supported. Owing to this structure, the suspension holder 6 has a function of suppressing the resonance of the wires 5.

The base 8 is formed integrally with the yokes 9, and is used for securing the suspension holder 6.

The yokes 9 are provided for bonding and securing the magnets 10, and are formed of a material having a high magnetic permeability.

The magnets 10 are bonded and secured to the yokes 9 so as to interpose both end surfaces of the lens holder 3 in the tangential direction. The magnets 10 each face the corresponding coils in the coil unit 7 with a small gap being retained therebetween. The magnets 10 act as a part of the magnetic circuit. The magnets 10 and an electromagnetic force generated by the conduction of the coil unit 7 generate a driving force. Since the magnets 10 and the coil unit 7 are located symmetrically, the point of application of the driving force is positioned at the profile center of the lens holder 3. Herein, the term "symmetrical" is used to mean both that (i) the two magnets 10 are symmetrical with respect to a plane existent between the two magnets 10 (the normal to the plane extends in the tangential direction) and (ii) the two magnets 10 are symmetrical with respect to a plane extending in the tangential direction and dividing both the two magnets 10 (the normal to the plane extends in the tracking direction).

FIG. 2A is an isometric view of the movable section 101 of the objective lens driving device 100 according to this embodiment. FIG. 2B is a plan view of the movable section 101.

As shown in FIG. 2A and FIG. 2B, the movable section 101 includes the first objective lens 1, the second objective lens 2, the lens holder 3, the terminal boards 4 and the coil unit 7. The movable section 101 is elastically supported by the wires 5 (FIG. 1), and is freely movable by a driving force generated by the magnetic circuit in the focusing direction and the tracking direction.

The coil unit 7 includes four focusing coils 7a and two tracking coils 7b. FIG. 2A shows two focusing coils 7a and one tracking coil 7b provided on one end surface of the lens holder 3 in the tangential direction. On the other end surface of the lens holder 3 in the tangential direction, two focusing coils and one tracking coil are also provided.

The tracking coils 7b are at the center or in the vicinity thereof of the end surfaces of the lens holder 3 in the tangential direction. Two focusing coils 7a are provided to both sides of each tracking coil 7b. The tracking coils 7b have a lengthy shape and are longer in the focusing direction than the focusing coils 7a.

When the two tracking coils 7b are made conductive in a magnetic field generated by the magnets 10 (FIG. 1), a driving force is generated in the tracking direction. When the four focusing coils 7a are made conductive in such a magnetic field, a driving force is generated in the focusing direction. When seen in the focusing direction, the coil unit 7 is symmetrical with respect to a first central plane 20 perpendicular to the tracking direction) which is defined by the central axis of the first objective lens (optical axis) and the central axis of the second objective lens (optical axis), and are also symmetrical with respect to a second central plane 21 which is equidistant from both end surfaces of the lens holder 3 in the tangential direction. Therefore, the point of application of the driving force (a driving force center 22) matches the profile center of the lens holder 3 both in the focusing direction and the tracking direction. At the profile center of the lens holder 3, the first central plane 20 and the second central plane 22 cross each other. The "central axis (optical axis) of an objective lens" refers to a straight line connecting the center of curvature of one surface of the objective lens on which light is incident and the center of curvature of the other surface of the objective lens.

By contrast, the mass center, namely, the gravity center, of the movable section 101 does not necessarily match the profile center thereof.

In terms of the weight, the movable section 101 is structured to be symmetrical with respect to the first central plane 20, but is not symmetrical with respect to the second central plane 21. The reason is that the mass distribution of the movable section 101 is not uniform due to the difference in the shape, weight and the like between the first objective lens 1 and the second objective lens 2. As a result, the gravity center of the movable section 101 is occasionally shifted from the profile center of the movable section 101.

For example, it is assumed that the first objective lens 1 is formed of glass and the second objective lens 2 is formed of a plastic material. Since the first objective lens 1 is heavier than the second objective lens 2, the gravity center of the entire movable section 101 is shifted in the tangential direction from the profile center. As mentioned in the Background of the Invention section of this specification, when the movable section 101 is driven in the focusing direction in the state where the gravity center and the driving force center 22 of the movable section 101 are shifted with respect to each other, pitching resonance is generated by which the entire movable section 101 is rotated with the axis extending in the tracking direction being used as the rotation center. This destabilizes the control on the objective lens driving device 100.

Hereinafter, a structure of the lens holder 3 adjusted in terms of the internal structure so as to solve the problem of the shift of the gravity center from the driving force center 22 when the lens holder 3 is incorporated into the movable section 101 and thus to remove the unnecessary resonance such as the pitching resonance or the like with no need to change the external profile thereof will be described.

Figure 3B:
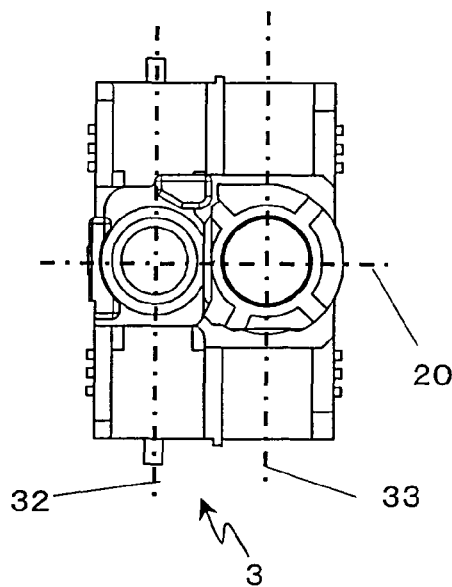
FIG. 3B is a plan view of the lens holder 3 according to Embodiment 1.
Figure 3C:
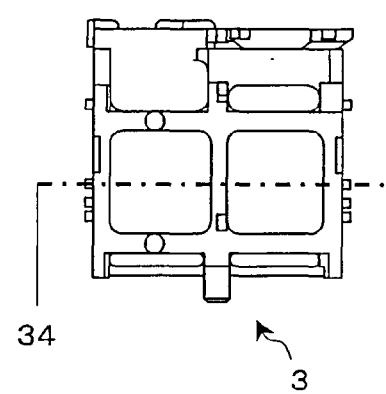
FIG. 3C is a front view of the lens holder 3 according to Embodiment 1.

FIG. 3A is an isometric view of the lens holder 3 according to this embodiment, FIG. 3B is a plan view of the lens holder 3 according to this embodiment, and FIG. 3C is a front view of the lens holder 3 according to this embodiment.

As shown in FIG. 3A, the lens holder 3 includes a first objective lens setting opening 25 and a second objective lens setting opening 26. To the first objective lens setting opening 25, the first objective lens 1 may be set and secured with an adhesive or the like. To the second objective lens setting opening 26, the second objective lens 2 may be set and secured with an adhesive or the like. More specifically, the second objective lens 2 may be set and secured to the swinging holder 3a with an adhesive or the like.

As understood from the above, the first objective lens setting opening 25 is located at an end of a first through-hole 30. The first through-hole 30 has a diameter which is slightly smaller than the diameter of the first objective lens setting opening 25. An entrance area of the first through-hole 30 is referred to as a first aperture 27. The second objective lens setting opening 26 is located at an end of a second through-hole 31. The second through-hole 31 has a diameter which is slightly smaller than the diameter of the second objective lens setting opening 26. An entrance area of the second through-hole 31 is referred to as a second aperture 28. The shapes of the first through-hole 30 and the second through-hole 31 will be described below in detail with reference to FIG. 4A and FIG. 4B.

Now, in order to describe the cross-sectional shape of the lens holder 3, planes will be defined with reference to FIG. 3B and FIG. 3C. A plane which is perpendicular to the first central plane 20 and includes the central axis of the first objective lens 1 is referred to a first plane 32. A plane which is perpendicular to the first central plane 20 and includes the central axis of the second objective lens 2 is referred to a second plane 33. Referring to FIG. 3C, a plane which is perpendicular to all the first central plane 20, the first plane 32 and the second plane 33 is referred to as a third plane 34.

Figure 4A:
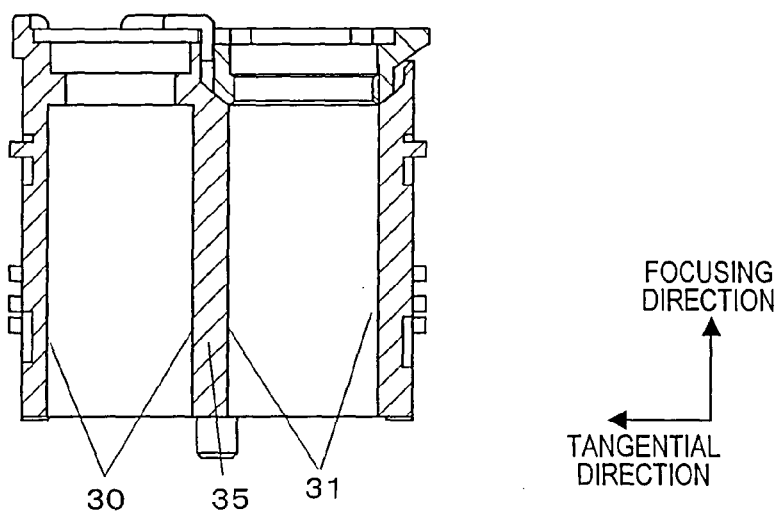
FIG. 4A is a cross-sectional view of the lens holder 3 according to Embodiment 1 taken along a first central plane 20.
Figure 4B:
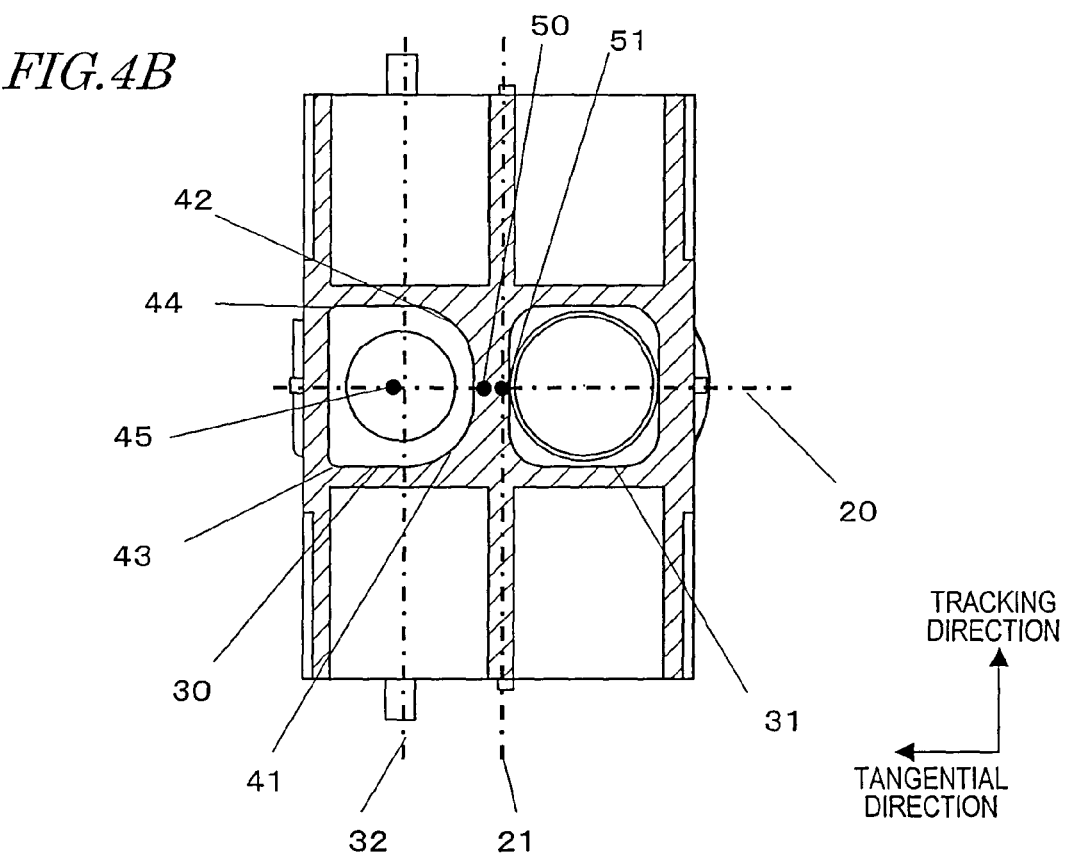
FIG. 4B is a cross-sectional view of the lens holder 3 according to Embodiment 1 taken along a third plane 34.

FIG. 4A is a cross-sectional view of the lens holder 3 according to this embodiment taken along the first central plane 20. FIG. 4B is a cross-sectional view of the lens holder 3 taken along the third central plane 34.

As shown in FIG. 4A, the first through-hole 30 and the second through-hole 31 extend towards a bottom surface of the lens holder 3 in the focusing direction.

The shapes of the first through-hole 30 and the second through-hole 31 are optimized to fulfill both the demands for a less weight and a higher rigidity, by removing unnecessary parts and providing ribs for maintaining the structural strength.

The movable section 101 could have a less weight to have an increased sensitivity by, for example, increasing the diameters of the first and second through-holes 30 and 31 and thus decreasing the thickness of parts of the lens holder 3 around the first and second through-holes 30 and 31, or by connecting the first and second through-holes 30 and 31 into one through-hole. However, this decreases the rigidity of the lens holder 3 and thus reduces the resonance frequency in a high frequency range. As a result, the lens holder 3 cannot be stably controlled and is not usable for an objective lens driving device which is required to operate in highly multiplied speed modes. By contrast, the lens holder 3 could have a higher rigidity by decreasing the diameters of the first and second through-holes 30 and 31. However, this increases the thickness of the parts around the through-holes 30 and 31 and does not realize a sensitivity sufficient for an operation in highly multiplied speed modes. Usually, the designing range for fulfilling both the demands for a less weight and a higher rigidity is not wide and is often specified in a pin-point manner.

The cross-section of the first through-hole 30 and the second through-hole 31 shown in FIG. 4A, taken along the first central plane 20, i.e., along the tangential direction and the focusing direction, is defined by lines substantially parallel in the focusing direction. Therefore, the cross-sectional shape of the first through-hole 30 and the cross-sectional shape of the second through-hole 31 shown in FIG. 4B are substantially the same regardless of the position in the focusing direction at which the cross-section is taken.

The cross-sections of the first through-hole 30 and the second through-hole 31 shown in FIG. 4B taken along the third plane 34 are symmetrical with respect to the first central plane 20, but the cross-section of the first through-hole 30 is asymmetrical with respect to the first plane 32.

Where the cross-section of the first through-hole 30 is asymmetrical only with respect to a particular direction (with respect to the first plane 32 in this embodiment) as described above, the thickness of the part of the lens holder 3 around the first through-hole 30 is changed and therefore the weight distribution is changed. This means that it is possible to change the weight balance only in such a direction. Namely, it is possible to adjust the weight balance of the lens holder 3 only by changing the shape of the cross-section of a hole thereof.

In this embodiment, as shown in FIG. 4B, the cross-section of the first through-hole 30 provided below the first objective lens 1 (now shown in FIG. 4B), which is heavier than the second objective lens 2, is substantially quadrangular. Areas 41 through 44 corresponding to the four corners of the quadrangle are arc-shaped. The radius of the arc-shaped areas 43 and 44 in an outer part of the lens holder 3 is smaller than the radius of the inner arc-shaped areas 41 and 42 in an inner part of the lens holder 3. Where the radii are adjusted in this manner, a centroid 45 of the cross-section is positioned in the lens holder 3 outer with respect to the central axis of the first objective lens 1. This means that the volume of the lens holder 3 is decreased by a larger amount in a part outer to the central axis of the first objective lens 1 as compared to in a part inner thereto. In this embodiment, the thickness of the outer part of the lens holder 3, which is far from the center of the movable section 101, is decreased by a larger amount as compared to the thickness of the inner part of the lens holder 3. In order to provide an equivalent effect of moving the gravity center, the thickness which needs to be decreased in this case is smaller than the thickness which needs to be decreased in the case where the part of the lens holder 3 around the first through-hole 30 is decreased by a uniform amount.

In this embodiment, only the volume of the outer part of the lens holder 3 is decreased. Therefore, the gravity center of the entire movable section 101 can be moved from a hypothetical gravity center 50 in the case where the cross-section of the first through-hole 30 is symmetrical with respect to the first plane 32 to a gravity center 51 matching the driving force center 22, without decreasing the thickness of a rib 35. This provides an objective lens driving device which is stably controllable with the generation of unnecessary resonance such as pitching resonance or the like being prevented.

The rib 35 between the first through-hole 30 and the second through-hole 31 shown in FIG. 4A is provided at the center of the lens holder 3 and is indispensable to keep the rigidity of the entire lens holder 3. However, the rib 35 cannot be very thick because the first objective lens 1 and the second objective lens 2 are located quite close to each other in order to reduce the size and weight of the lens holder 3. It is not desirable to make the rib 35 excessively thin either because the lens holder 3 needs to be sufficiently rigid. Therefore, the above-described structure of this embodiment is preferable.

In the above description, the cross-section of the first through-hole 30 is substantially quadrangular with the four arc-shaped corners, and the radius of the outer arc-shaped areas 43 and 44 is smaller than the radius of the inner arc-shaped areas 41 and 42. This structure has been derived by the present inventors as a result of various experiments.

The present inventors paid attention to the phenomenon that the performance of the lens holder 3 is significantly varied in accordance with how the radii of the arc-shaped areas 41 through 44 are different. The present inventors quantitatively evaluated lens holders with various radii of the arc-shaped areas. The criteria of the evaluation were the weight of the lens holder, the shifting amount of the gravity center, and the resonance frequency.

Figure 5A:
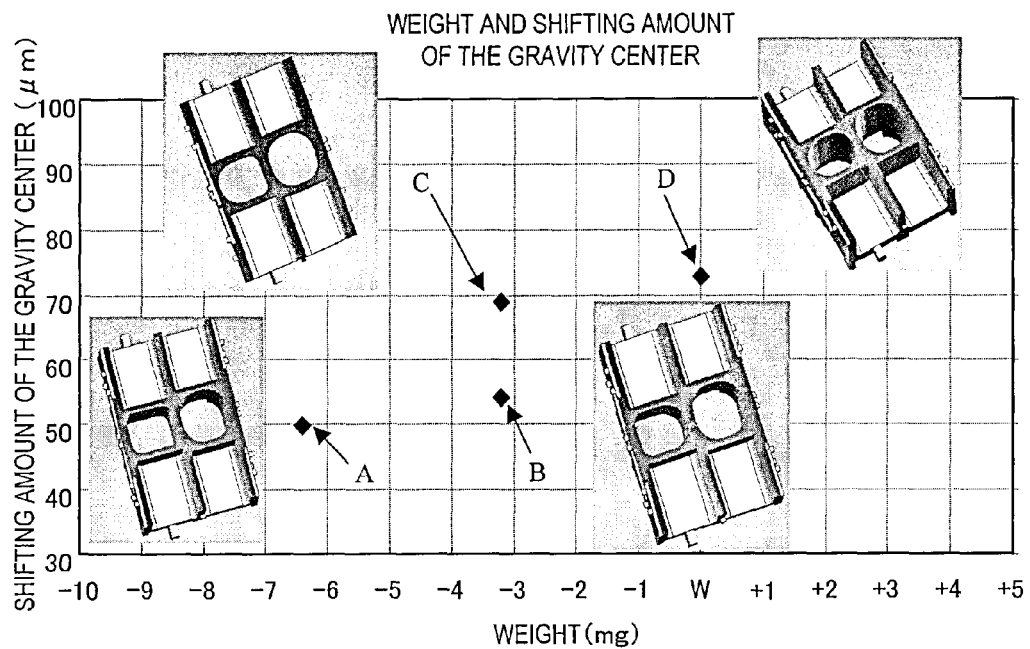
FIG. 5A shows the relationship between the weight and the shifting amount of the gravity center for lens holders A through D produced with four different combinations of radii of arc-shaped areas 41 through 44.

Regarding lens holders A through D produced with four different combinations of radii of the arc-shaped areas 41 through 44, FIG. 5A shows the relationship between the weight and the shifting amount of the gravity center. The weight is shown as a difference from weight W of the lens holder D. The horizontal axis represents the weight, which is smaller as being closer to the left end of the horizontal axis. The shifting amount of the gravity center is represented as a shifting amount from the driving force center. The vertical axis represents the shifting amount of the gravity center from the driving force center, which is smaller as being closer to the bottom end of the vertical axis.

A lens holder having a less weight and a smaller shifting amount of the gravity center is preferable. Namely, with reference to FIG. 5A, a lens holder plotted more leftward and more downward is more preferable. The most preferable lens holder among the four lens holders A through D is the lens holder A, which is plotted closest to the bottom left corner. In the lens holder A, the arc-shaped areas in both the outer part and the inner part have a small radius (R). The next preferable lens holder is the lens holder B, in which the arc-shaped areas only in the outer part have a small radius. The still next preferable lens holder is the lens holder C, in which the arc-shaped areas only in the inner part have a small radius. The least preferable lens holder is the lens holder D, in which the arc-shaped areas 41 through 44 are not substantially existent and the first objective lens setting opening 25 is substantially circular.

Figure 5B:
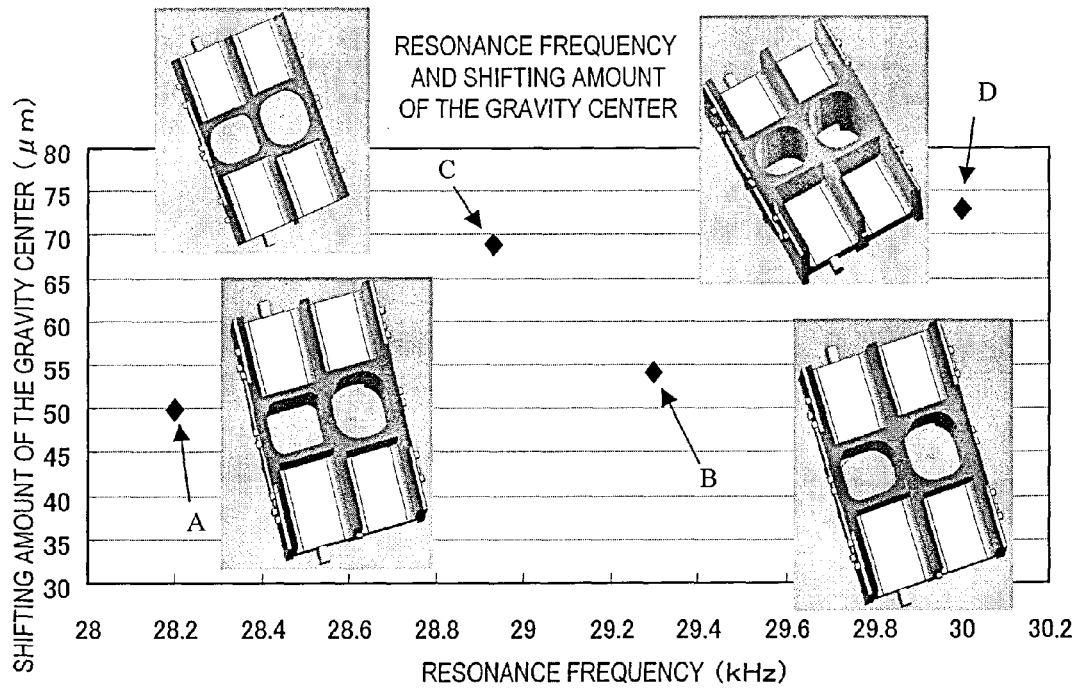
FIG. 5B shows the relationship between the resonance frequency and the shifting amount of the gravity center for the lens holders A through D produced with four different combinations of radii of the arc-shaped areas 41 through 44.

Also regarding the lens holders A through D produced with the four different combinations of radii of the arc-shaped areas 41 through 44, FIG. 5B shows the relationship between the resonance frequency and the shifting amount of the gravity center.

In FIG. 5B, a lens holder plotted more rightward and more downward is more preferable. The lens holder A exhibiting the best performance in FIG. 5A shows the lowest, i.e., the worst, resonance frequency among the four lens holders A through D. The lens holder B shows a relatively high resonance frequency and a relatively small shifting amount of the gravity center. The performance of the lens holder C is clearly inferior to the performance of the lens holder B. The lens holder D shows a preferable resonance frequency but the largest, i.e., the worst, shifting amount of the gravity center among the four lens holders A through D.

From FIG. 5A and FIG. 5B, it is understood that the lens holder B shows the best balanced performance in all the weight, the shifting amount of the gravity center and the resonance frequency. Based on these results, the present inventors adopted the lens holder B in which the arc-shaped areas only in the outer part have a small radius (R) as described above as the lens holder 3.

According to this embodiment, the cross-section of the first through-hole 30 for the heavier first objective lens 1 is asymmetrical only with respect to the first plane 32. More specifically, the thickness of the outer part of the lens holder 3 with respect to the center of the movable section 101 is decreased. Owing to such an arrangement, a large effect of moving the gravity center can be provided by decreasing the thickness by a small amount. In this manner, the generation of unnecessary resonance can be prevented without decreasing the thickness of the rib 35, namely, with the rigidity reduction of the movable section 101 being minimized.

Which structure is preferable for the lens holder varies in accordance with the performance required of the lens holder. Depending on the required performance, any of the four lens holders A through D may be adopted. For example, the position of the gravity center 51 may be optimized by decreasing the radius of the arc-shaped areas only in the inner part as in the lens holder C.

In the case where the first objective lens 1 and the second objective lens 2 are not much different in the weight, the hypothetical gravity center 50 may not be necessarily positioned in the direction of the first objective lens 1 when seen from the second central plane 21. In such a case, a through-hole located in the direction of the hypothetical gravity center 50 when seen from the second central plane 21 may be made asymmetrical. In this case also, substantially the same effect is provided.

In this embodiment, it is assumed that the hypothetical gravity center 50 is located on the first central plane 20 and that the weights of the first objective lens 1 and the second objective lens 2 are hardly unbalanced in the tracking direction. However, when the hypothetical gravity center 50 is not positioned on the first central plane 20, the first through-hole 30 and the second through-hole 31 may be made asymmetrical in the direction in which the hypothetical gravity center 50 is located when seen from the first central plane 20.

For example, with reference to FIG. 4B, when the hypothetical gravity center 50 is shifted from the driving force center 22 (FIG. 2B) in a positive tracking direction (upward in FIG. 4B) as well as in the tangential direction, all the four arc-shaped areas 41 through 44 may have different radii, where the arc-shaped area 41 has a larger radius than the arc-shaped area 42 and the arc-shaped area 43 has a larger radius than the arc-shaped area 44. Such a structure provides a stable objective lens driving device which is stably controllable with the generation of unnecessary resonance such as rolling resonance caused by the weight unbalance in the tracking direction being prevented as well as with the pitching resonance caused by the weight unbalance in the tangential direction being prevented.

In this embodiment, the first objective lens 1 and the second objective lens 2 are formed of different materials (glass and a plastic material). The first objective lens 1 and the second objective lens 2 may be formed of an identical material. In the case where the first objective lens 1 for BDs is also formed of a plastic material, the first objective lens 1 can be produced at lower cost and also reduced in the weight. However, it is fully conceivable that the first objective lens 1 and the second objective lens 2 are still different in the weight due to the difference in the specifications of the objective lenses. Therefore, the structure described in this embodiment may be preferable.

Embodiment 2

FIG. 6A is a cross-sectional view of a lens holder 103 according to this embodiment taken along the first central plane 20. FIG. 6B is a cross-sectional view of the lens holder 103 taken along the third central plane 34. The other structural elements of the lens holder 103 including the external shape are the same as those of the lens holder 3 in Embodiment 1 and will not be described here. The lens holder 103 may be incorporated into the objective lens driving device 100 in place of the lens holder 3 in Embodiment 1.

The cross-section shown in FIG. 6A, taken along the first central plane 20 (FIG. 6B) i.e., along the tangential direction and the focusing direction, is defined by lines substantially parallel in the focusing direction. Therefore, the cross-sectional shape of the first through-hole 30 and the cross-sectional shape of the second through-hole 31 shown in FIG. 6B are substantially the same regardless of the position in the focusing direction at which the cross-section is taken.

The cross-sections of the first through-hole 30 and the second through-hole 31 shown in FIG. 6B are symmetrical with respect to the first central plane 20. The cross-section of the first through-hole 30 is asymmetrical with respect to the first plane 32, and the cross-section of the second through-hole 31 is asymmetrical with respect to the second plane 33. Owing to such a structure, the gravity center can be matched to the driving force center even where the weight difference between the first objective lens 1 and the second objective lens 2 is larger and thus the lens holder 103 is more unbalanced than the lens holder 3 in Embodiment 1.

Specifically, the cross-section of the second through-hole 31 provided below the second objective lens 2 which is more lightweight than the first objective lens 1 is substantially quadrangular. Areas 61 through 64 corresponding to the four corners of the quadrangle are arc-shaped. The radius of the arc-shaped areas 63 and 64 in an outer part of the lens holder 103 is larger than the radius of the arc-shaped areas 61 and 62 in an inner part of the lens holder 103.

Owing to such a structure, a second centroid 65 of the cross-section of the second through-hole 31 is positioned in the lens holder 103 inner with respect to the center of the second objective lens 2. The volume of the lens holder 103 is left unremoved by a larger amount in a part outer to the central axis of the second objective lens 2 as compared to in a part inner thereto. In this embodiment, the thickness of the outer part of the lens holder 103, which is far from the center of the movable section 101, is left unremoved by a larger amount as compared to the thickness of the inner part of the lens holder 103; namely, the thickness of the outer part of the lens holder 103 is increased. In order to provide an equivalent effect of moving the gravity center, the thickness which needs to be increased in this case is smaller than the thickness which needs to be increased in the case where the part of the lens holder 103 around the second through-hole 31 is increased by a uniform amount.

Namely, the gravity center of the entire movable section 101 can be moved from the hypothetical gravity center 50 in the case where the cross-section of the second through-hole 31 is symmetrical with respect to the second plane 33 to the gravity center 51 matching the driving force center 22, with the sensitivity reduction of the movable section 101 caused by the increase in the thickness being suppressed minimum. This provides an objective lens driving device which is stably controllable with the generation of unnecessary resonance such as pitching resonance or the like being prevented.

In addition, only the radii of the arc-shaped areas 61 through 64 at the four corners of the substantially quadrangular cross-section of the second through-hole 31 are changed. Therefore, the position of the gravity center 51 can be optimized only by changing the thickness of the inner part of the lens holder 103.

According to this embodiment, the cross-section of the second through-hole 31 for the more lightweight second objective lens 2 is asymmetrical only with respect to the second plane 33. More specifically, the thickness of the outer part of the lens holder 103 with respect to the center of the movable section 101 is increased. Thus, a large effect of moving the gravity center can be provided by increasing the thickness by a small amount. In this manner, the generation of unnecessary resonance can be prevented with the driving force reduction being suppressed minimum.

Embodiment 3

Figure 7A:
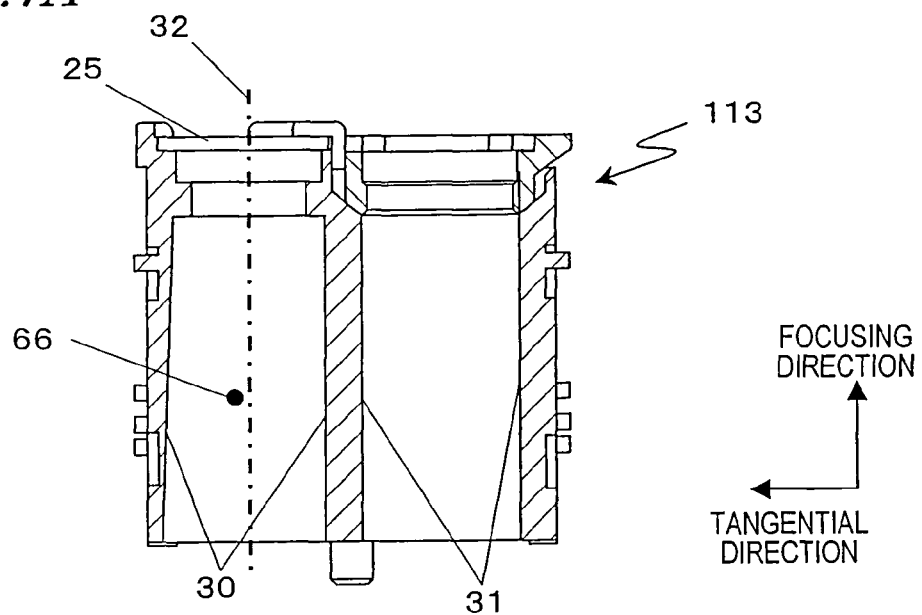
FIG. 7A is a cross-sectional view of a lens holder according to Embodiment 3 taken along the first central plane 20.
Figure 7B:
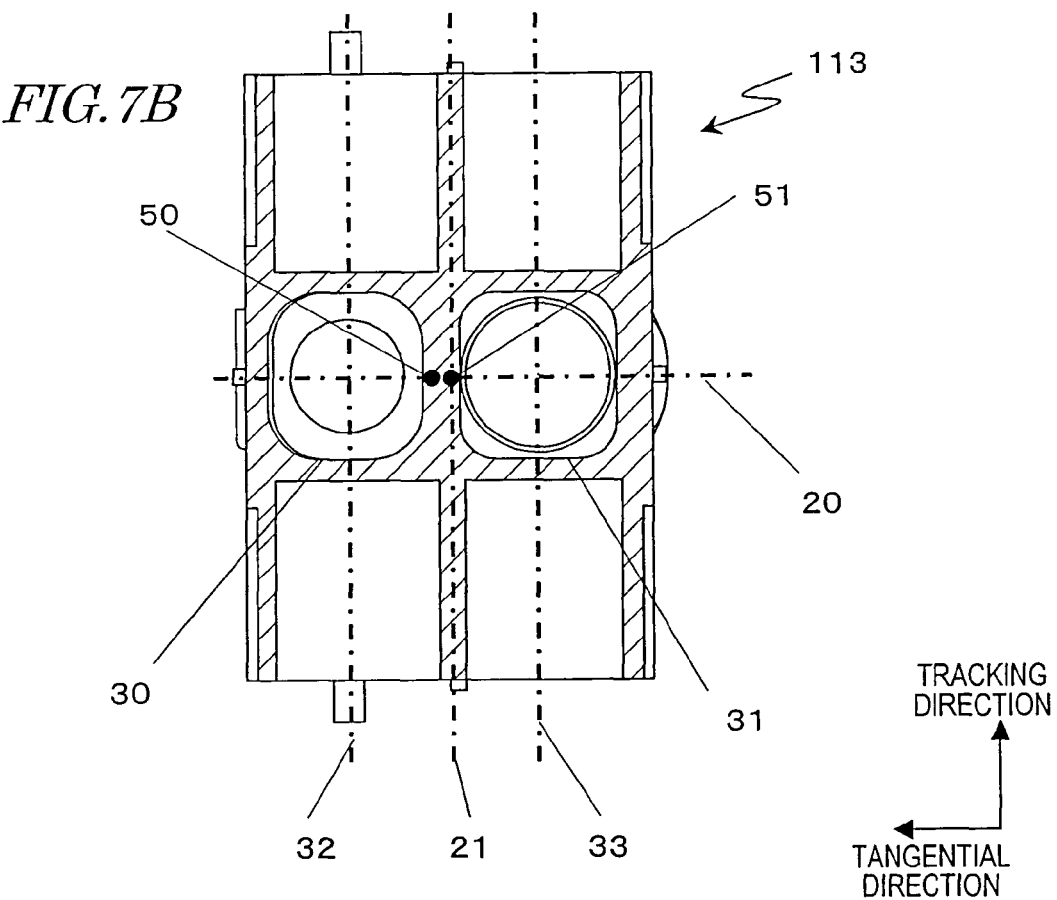
FIG. 7B is a cross-sectional view of the lens holder 113 according to Embodiment 3 taken along the third plane 34.

FIG. 7A is a cross-sectional view of a lens holder 113 according to this embodiment taken along the first central plane 20. FIG. 7B is a cross-sectional view of the lens holder 113 taken along the third central plane 34. The other structural elements of the lens holder 113 including the external shape are the same as those of the lens holder 3 in Embodiment 1 and will not be described here. The lens holder 113 may be incorporated into the objective lens driving device 100 in place of the lens holder 3 in Embodiment 1.

As shown in FIG. 7A, the cross-section of the first through-hole 30 taken along the first central plane 20 (FIG. 7B), i.e., along the tangential direction and the focusing direction, is not defined by lines parallel in the focusing direction, but is tapered. An outer part of a peripheral wall of the first through-hole 30 is more distanced from the central axis of the first through-hole 30 as being farther from the first objective lens setting opening 25. In other words, the thickness of the part of the lens holder 113 sandwiched between the first through-hole 30 and an outer surface of the lens holder 113 is made smaller as being farther from the first objective lens setting opening 25. Because the first through-hole 30 is tapered as described above, the first through-hole 30 is asymmetrical with respect to the first plane 32.

In the lens holder 113, a third centroid 66, which is the centroid of the cross-section of the first through-hole 30 taken along the first central plane 20, is positioned in the lens holder 113 outer with respect to the central axis of the heavier first objective lens 1. The thickness of a part of the lens holder 113 outer with respect to the first through-hole 30 is decreased by a larger amount as compared to the thickness of a part of the lens holder 113 inner with respect to the central axis of the first through-hole 30. In this embodiment, the thickness of the outer part of the lens holder 113, which is far from the center of the movable section 101, is decreased by a larger amount as compared to the thickness of the inner part of the lens holder 113. In order to provide an equivalent effect of moving the gravity center, the thickness which needs to be decreased in this case is smaller than the thickness which needs to be decreased in the case where the part of the lens holder 113 around the first through-hole 30 is decreased by a uniform amount.

Namely, the gravity center of the entire movable section 101 can be moved from the hypothetical gravity center 50 in the case where the cross-section of the first through-hole 30 is symmetrical with respect to the first plane 32 to the gravity center 51 matching the driving force center 22, with the rigidity reduction caused by the decrease in the thickness being suppressed minimum. This provides an objective lens driving device which is stably controllable with the generation of unnecessary resonance such as pitching resonance or the like being prevented.

In this embodiment, as shown in FIG. 7B, the cross-sections of the first through-hole 30 and the second through-hole 31 taken along the third plane 34 are substantially symmetrical with respect to the first plane 32 and the second plane 33. These cross-sections may be asymmetrical with respect to the first plane 32 and the second plane 33 while the hypothetical gravity center 50 may match the driving force center 22.

Embodiment 4

Figure 8A:
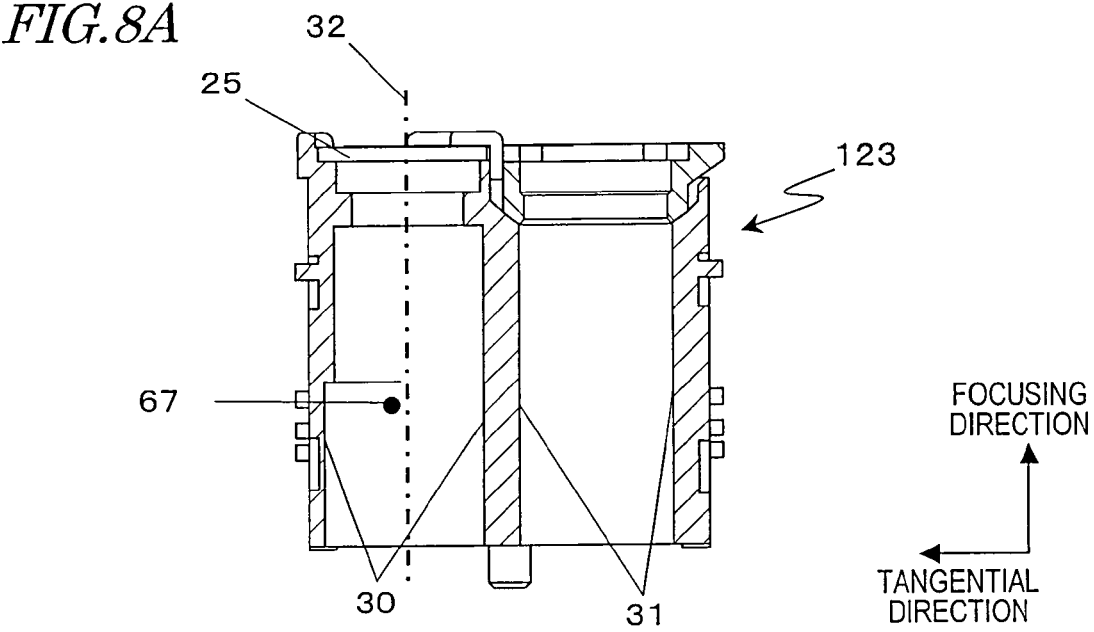
FIG. 8A is a cross-sectional view of a lens holder 123 according to Embodiment 4 taken along the first central plane 20.
Figure 8B:
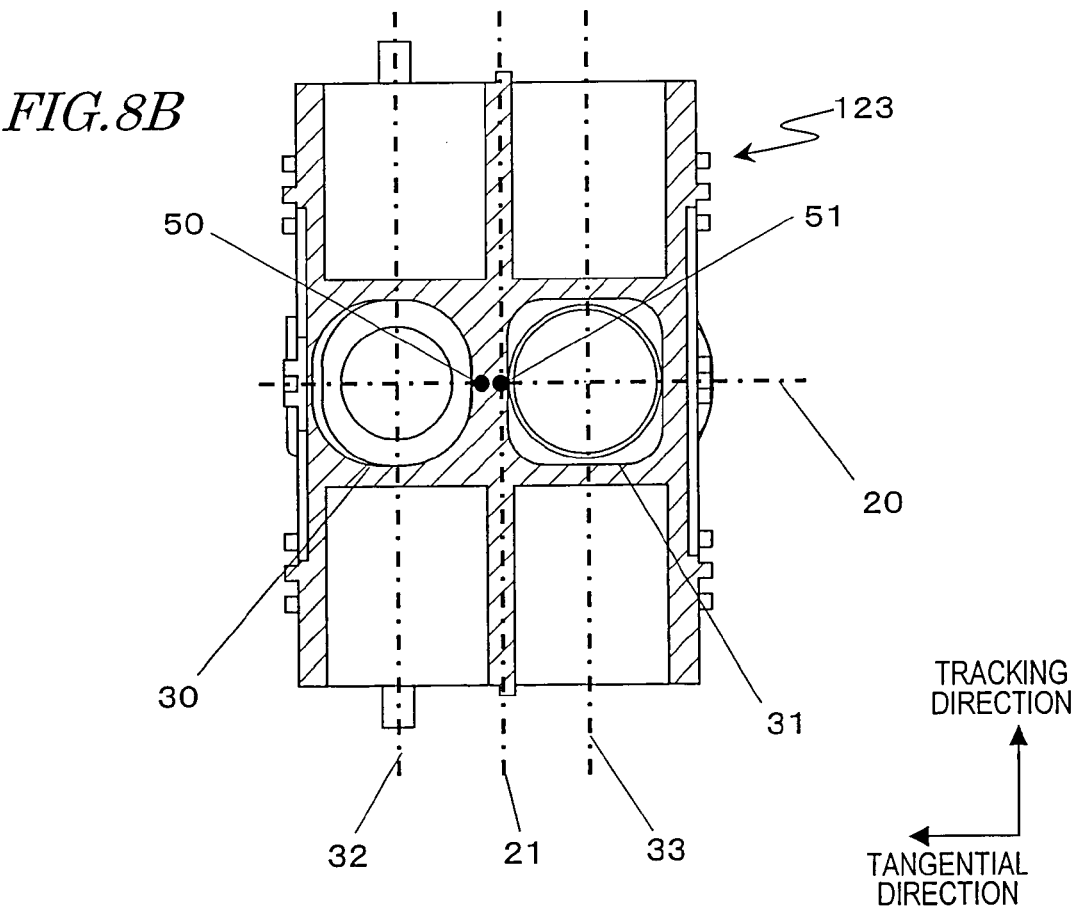
FIG. 8B is a cross-sectional view of the lens holder 123 according to Embodiment 4 taken along the third plane 34.

FIG. 8A is a cross-sectional view of a lens holder 123 according to this embodiment taken along the first central plane 20. FIG. 8B is a cross-sectional view of the lens holder 123 taken along the third central plane 34. The other structural elements of the lens holder 123 including the external shape are the same as those of the lens holder 3 in Embodiment 1 and will not be described here. The lens holder 123 may be incorporated into the objective lens driving device 100 in place of the lens holder 3 in Embodiment 1.

As shown in FIG. 8A, the cross-section of the first through-hole 30 taken along the first central plane 20 (FIG. 8B), i.e., along the tangential direction and the focusing direction, is stepped in the focusing direction, such that an outer part of a peripheral wall of the first through-hole 30 is more distanced from the central axis of the first through-hole 30 as being farther from the first objective lens setting opening 25. In other words, the thickness of the part of the lens holder 123 sandwiched between the first through-hole 30 and an outer surface of the lens holder 123 is made smaller step by step as being farther from the first objective lens setting opening 25. Because the sandwiched part is stepped as described above, the first through-hole 30 is asymmetrical with respect to the first plane 32.

In the lens holder 123, a fourth centroid 67, which is the centroid of the cross-section of the first through-hole 30 taken along the first central plane 20, is positioned in the lens holder 123 outer with respect to the central axis of the heavier first objective lens 1. The thickness of a part of the lens holder 123 outer with respect to the first through-hole 30 is decreased by a larger amount as compared to the thickness of a part of the first through-hole 30 inner with respect to the central axis of the first through-hole 30. In this embodiment, the thickness of the outer part of the lens holder 123, which is farther from the center of the movable section 101, is decreased by a larger amount as compared to the thickness of the inner part of the lens holder 123. In order to provide an equivalent effect of moving the gravity center, the thickness which needs to be decreased in this case is smaller than the thickness which needs to be removed in the case where the part of the lens holder 123 around the first through-hole 30 is decreased by a uniform amount.

Namely, the gravity center of the entire movable section 101 can be moved from the hypothetical gravity center 50 in the case where the cross-section of the first through-hole 30 is symmetrical with respect to the first plane 32 to the gravity center 51 matching the driving force center 22, with the rigidity reduction caused by the decrease in the thickness being suppressed minimum. This provides an objective lens driving device which is stably controllable with the generation of unnecessary resonance such as pitching resonance or the like being prevented.

In this embodiment, as shown in FIG. 8B, the cross-sections of the first through-hole 30 and the second through-hole 31 taken along the third plane 34 are substantially symmetrical with respect to the first plane 32 and the second plane 33. These cross-sections may be asymmetrical with respect to the first plane 32 and the second plane 33 while the hypothetical gravity center 50 may match the driving force center 22. In this embodiment, the cross-section of the first through-hole 30 taken along the first central plane 20 has one step along the outer part (in the tangential direction) of the peripheral wall. The present invention is not limited to this, and the cross-section may have a plurality of steps. In this case also, substantially the same effect is provided.

Embodiment 5

Figure 9:
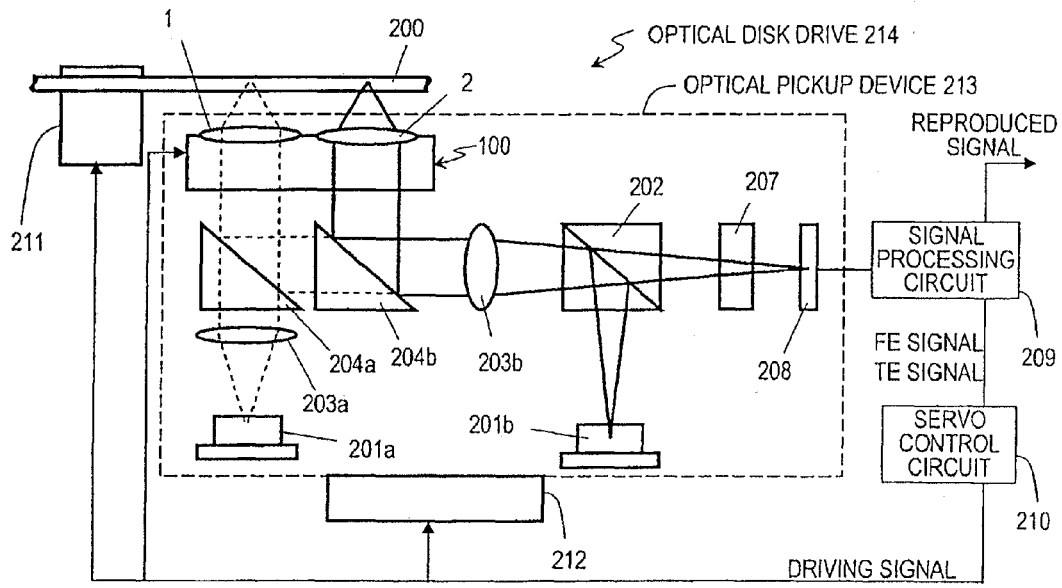
FIG. 9 shows a structure of functional blocks of an optical pickup device 213 according to Embodiment 5 and an optical disk 214, also according to Embodiment 5, including optical pickup device 213.
Figure 10A:
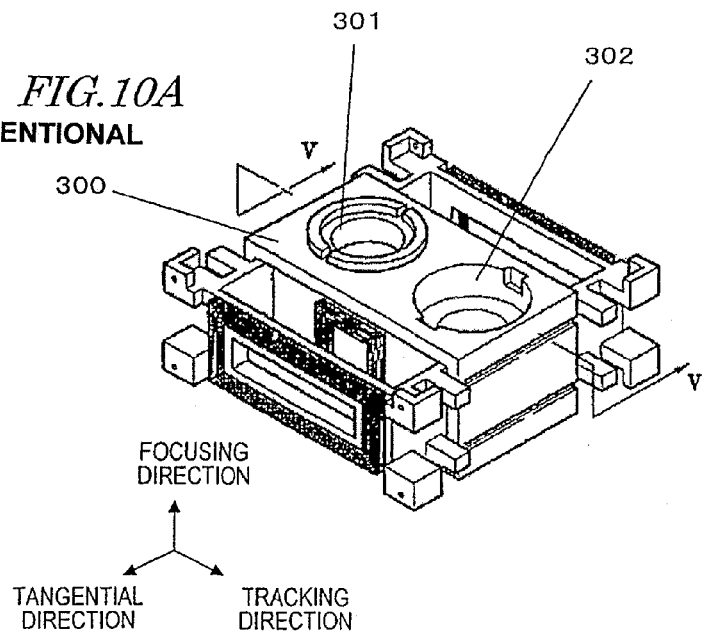
FIG. 10A shows an example of an objective lens driving device, of a conventional optical pickup device, having two types of objective lenses mounted thereon.
Figure 10B:
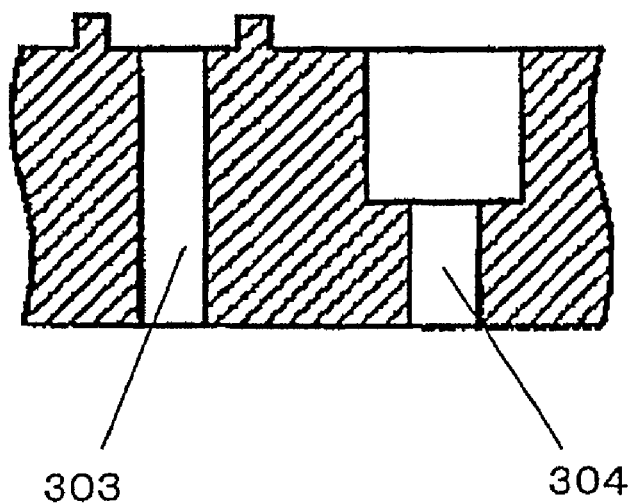
FIG. 10B shows a first through-hole 303 and a second through-hole 304 passing through a lens holder 300 and having a circular cross-section.

FIG. 9 shows a structure of functional blocks of an optical pickup device 213 according to this embodiment and an optical disk drive 214 including the optical pickup device 213. The optical pickup device 213 includes the objective lens driving device 100.

The optical disk drive 214 includes the optical pickup device 213, a signal processing circuit 209, a servo control circuit 210, the spindle motor 211, and a traverse motor 212. FIG. 9 shows an optical disk 200 for the convenience of description, and the optical disk 200 is not an element of the optical disk drive 214.

Hereinafter, an operation of the optical disk drive 214 will be described. The optical pickup device 213 irradiates the optical disk 200 with an optical beam and detects light reflected by the optical disk 200. Thus, the optical pickup device 213 outputs a light amount signal corresponding to the position at which the reflected light is detected and the amount of the detected reflected light. In accordance with the light amount signal which is output from the optical pickup device 213, the signal processing circuit 209 generates and outputs, for example, a focusing error (FE) signal representing the focusing state of the optical beam on the optical disk 200 and a tracking error (TE) signal representing the positional relationship between the focusing position of the light beam and the track of the optical disk 200.

Based on these signals, the servo control circuit 210 generates a plurality of types of driving signals. The type of the driving signal varies in accordance with to which the signal is output. The signals are output to the spindle motor 211, the traverse motor 212 or the objective lens driving device 100 of the optical pickup device 213.

The spindle motor 211 rotates the optical disk 200 at a rotation rate in accordance with the recording rate/reproduction rate based on a received driving signal. The traverse motor 212 moves the optical pickup device 213 in a radial direction of the optical disk 200 to an intended recording position or reproduction position based on a received driving signal.

The objective lens driving device 100 adjusts the position of the first objective lens 1 or the second objective lens 2 based on a received driving signal. Thus, the light beam directed to the optical disk 200 is controlled so as not to be focused outside the recording layer of the optical disk 200.

In the state where the light beam is controlled so as not to be focused outside the recording layer, the signal processing circuit 209 outputs a reproduced signal based on the light amount signal. The reproduced signal represents data written on the optical disk 200. Thus, the data is read from the optical disk 200. Data can be written to the optical disk 200 by increasing the optical power of the light beam as compared to the optical power for reproducing data.

Hereinafter, a structure of the optical pickup device 213 will be described. The optical pickup device 213 includes the objective lens driving device 100 including the first objective lens 1 and the second objective lens 2, light sources 201a and 201b, a beam splitter 202, collimator lenses 203a and 203b, mirrors 204a and 204b, a cylindrical lens 207, and a photodiode 208.

The light source 201a is a semiconductor laser light source for emitting blue laser beam having a wavelength of 405 nm. The light source 201b is a semiconductor laser light source for emitting red laser beam having a wavelength of 660 nm. Both light sources 201a and 201b irradiate the recording layer of the optical disk 200 with coherent light for reading or writing data.

The beam splitter 202 reflects the light beam emitted from the light source 201b toward the collimator lens 203b.

The collimator lens 203a converts the light beam emitted from the light source 201a into parallel light. The collimator lens 203b converts the light beam emitted from the light source 201b into parallel light.

The mirror 204a transmits the incident light beam toward the optical disk 200. The mirror 204b reflects the incident light beam toward the optical disk 200.

The first objective lens 1 and the second objective lens 2 of the objective lens driving device 100 each focus the corresponding light beam to the recording layer of the optical disk 200.

Now, it is assumed that the optical disk 200 is a DVD and the laser light source 201b outputs red laser beam. The red laser beam is reflected by the beam splitter 202 and is focused onto the optical disk 200 via the collimator lens 203b, the mirror 204b and the second objective lens 2.

The objective lens driving device 100 changes the position of the second objective lens 2 in a direction perpendicular and/or parallel to the optical disk 200 in accordance with the level of the driving signal applied to the objective lens driving device 100, and thus focuses the light beam on the recording layer of the optical disk 200.

The light reflected by the optical disk 200 is transmitted through the beam splitter 202 via the same path as the forward path mentioned above but in the opposite direction, and is incident on the cylindrical lens 207. The cylindrical lens 207 focuses the light beam on the photodiode 208. The photodiode 208 receives the light beam reflected by the recording layer of the optical disk 200 and converts the light beam into an electric signal (light amount signal) in accordance with the light amount. The photodiode 208 may include a plurality of light receiving elements. The signal processing circuit 209, upon receiving the light amount signal, generates an FE signal and a TE signal using, for example, the information on which light receiving element has output the light amount signal.

An objective lens driving device according to the present invention changes the thickness of an outer part of the lens holder which surrounds the first through-hole 30 or the second through-hole 31, such that the gravity center of the movable section 101 matches the driving force center 22. Therefore, the changing amount of the thickness can be minimized. Owing to this, the objective lens driving device according to the present invention is capable of minimizing the rigidity reduction or the sensitivity reduction and thus suppressing unnecessary resonance, and therefore is useful as a highly stable objective lens driving device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2006-273821 filed on Oct. 5, 2006 and No. 2007-253889 filed on Sep. 28, 2007, the entire contents of which are hereby incorporated by reference.

What is claimed is:

1. An objective lens driving device usable for an optical pickup device, the objective lens driving device comprising:
    a first objective lens for focusing first laser beam;
    a second objective lens for focusing second laser beam; and
    a lens holder for supporting the first objective lens and the second objective lens,
    wherein a first through-hole and a second through-hole are provided in the lens holder, the first through-hole allowing the first laser beam to pass therethrough and a second through-hole allowing the second laser beam to pass therethrough, and
    wherein where a plane is defined as a central plane by a central axis of the first objective lens and a central axis of the second objective lens, a plane which is perpendicular to the central plane and includes the central axis of the first objective lens is defined as a first plane, and a plane which is perpendicular to the central plane and includes the central axis of the second objective lens is defined as a second plane; the first through-hole is asymmetrical with respect to the first plane and/or the second through-hole is asymmetrical with respect to the second plane.

2. The objective lens driving device according to claim 1, wherein the first objective lens is heavier than the second objective lens, and a centroid of a cross-section of the first through-hole taken along a plane perpendicular to the central axis of the first objective lens is positioned in the lens holder outer with respect to the central axis of the first objective lens.

3. The objective lens driving device according to claim 2, wherein the cross-section of the first through-hole taken along the plane perpendicular to the central axis of the first objective lens is substantially quadrangular; areas corresponding to four corners of the substantially quadrangular cross-section are formed to be arc-shaped; and two of the arc-shaped areas positioned in an outer area of the lens holder have a smaller radius than the other two of the arc-shaped areas positioned in an inner area of the lens holder.

4. The objective lens driving device according to claim 1, wherein the second objective lens is more lightweight than the first objective lens, and a centroid of a cross-section of the second through-hole taken along a plane perpendicular to the central axis of the second objective lens is positioned in the lens holder inner with respect to the central axis of the second objective lens.

5. The objective lens driving device according to claim 4, wherein the cross-section of the second through-hole taken along the plane perpendicular to the central axis of the second objective lens is substantially quadrangular; areas corresponding to four corners of the substantially quadrangular cross-section are formed to be arc-shaped; and two of the arc-shaped areas positioned in an inner area of the lens holder have a smaller radius than the other two of the arc-shaped areas positioned in an outer area of the lens holder.

6. The objective lens driving device according to claim 1, wherein the first objective lens is heavier than the second objective lens; and a centroid of the cross-section of the first through-hole taken along the central plane is positioned in the lens holder outer with respect to the central axis of the first objective lens.

7. The objective lens driving device according to claim 6, wherein a peripheral wall of the first through-hole is more distanced from the central axis of the first through-hole at least at one position in accordance with a distance from the first objective lens.

8. The objective lens driving device according to claim 7, wherein the peripheral wall of the first through-hole is more distanced from the central axis of the first through-hole continuously or step by step in accordance with a distance from the first objective lens.

9. The objective lens driving device according to claim 1, wherein the first objective lens and the second objective lens have different weights.

10. The objective lens driving device according to claim 9, wherein one of the first objective lens and the second objective lens is a glass lens and other is a plastic lens.

11. The objective lens driving device according to claim 9, wherein the first objective lens and the second objective lens are formed of an identical material.

12. An optical pickup device, comprising:
    the objective lens driving device according to claim 1;
    a first laser light source for outputting first laser beam; and
    a second laser light source for outputting second laser beam;
    wherein the first laser beam and the second laser beam are respectively focused onto information recording surfaces of different types of optical disks.

13. An optical disk drive, comprising:
    the optical pickup device according to claim 12;
    a motor for driving an optical disk to rotate; and
    a control section for controlling the optical pickup device and the motor.

* * * * *

UNITED STATES PATENT AND TRADEMARK OFFICE
CERTIFICATE OF CORRECTION

| | | |
|---|---|---|
| PATENT NO. | : 7,729,212 B2 | Page 1 of 1 |
| APPLICATION NO. | : 11/866441 | |
| DATED | : June 1, 2010 | |
| INVENTOR(S) | : Osamu Kajino et al. | |

It is certified that error appears in the above-identified patent and that said Letters Patent is hereby corrected as shown below:

Column 18, line 42, "and other" should read -- and the other --;
line 48, "outputting first laser beam" should read -- outputting the first laser beam --; and
line 49, "outputting second laser" should read -- outputting the second laser --.

Signed and Sealed this

Ninth Day of November, 2010

David J. Kappos
*Director of the United States Patent and Trademark Office*